2,965,604
POLYMERIZATION OF CHLOROPRENE

Anton R. Heinz and Hans Haberland, Leverkusen, and Dietrich Rosahl, Koln-Stammheim, Germany, assignors to Farbenfabriken Bayer Aktiengesellschaft, Leverkusen, Germany, a corporation of Germany No Drawing. Filed Dec. 29, 1958, Ser. No. 783,202

Claims priority, application Germany Jan. 2, 1958

6 Claims. (Cl. 260—45.8)

The present invention relates to an improved and efficient process for the polymerization and copolymerization of chloroprene (2-chlorobutadiene-1.3) in the presence of catalysts.

In a further development of this process it has now been found that the said boron trialkyls in combination with molecular sulphur are very suitable as catalysts for the polymerization of chloroprene (2-chlorobutadi-1.3-ene) in aqueous emulsion. It is possible for the chloroprene to contain anti-oxidizing agents or stabilizers.

Boron trialkyls suitable for use in carrying out the process are the organic boron compounds of the general formula:

in which $R_1$, $R_2$ and $R_3$ represent alkyl (preferably alkyl with 1 to 6 carbon atoms), cycloalkyl such as cyclopentyl, cyclohexyl or aralkyl groups such as benzyl.

Examples of such compounds are boron trimethyl, boron triethyl, boron tripropyl, boron triisopropyl, the several isomeric boron tributyls, and boron tricyclohexyl.

The polymerization is carried out in aqueous emulsion, preferably in the presence of known emulsifiers and regulators or modifiers. For example, 100 parts by weight of monomers can be used per 80 to 250 parts by weight of water. The quantity of boron trialkyl is generally about 0.1 to 2.5 percent by weight and the amount of sulphur generally about 0.05 to 1 percent by weight, calculated on the weight of monomers used. 0.01 to 3 percent by weight of antioxidizing agents can be present in the chloroprene.

It is usual for the monomeric chloroprene to be stabilized against uncontrolled polymerization, which can easily occur during storage and during transport, by using antioxidizing agents such as phenothiazine or those of the series of alkylated and aralkylated phenols and diphenylamines. It is desirable to leave these stabilizers in the monomer during the polymerization reaction since the removal of the stabilizers presents considerable disadvantages. In the first place, it is necessary to separate the chloroprene by distillation from the antioxidizing agents contained therein, this involving losses of chloroprene. Furthermore, the unstabilized chloroprene which is obtained must be subjected to strong cooling because of its great tendency to polymerization, and it must be stored with complete exclusion of air. Moreover, the polymers obtained in the presence of stabilizers are characterized by particularly favourable properties.

The use of molecular sulphur as a coactivator of the organic boron compounds when polymerizing stabilized chloroprene allows of obtaining a very uniform polymerization velocity. The presence of small quantities of air or oxygen has no disturbing effect on the polymerization.

The present process is also suitable for the production of copolymers of chloroprene and compounds with one or with several aliphatic carbon-carbon double bonds, such as for example conjugated diolefines having 1 to 6 carbon atoms such as butadiene, 1.2- or 2.3-dichlorobutadiene-1.3, 1- or 2-cyanobutadiene-1.3, isoprene, vinyl-aromatic compounds such as styrene, acrylic and methacrylic acid esters with monohydric saturated aliphatic and cycloaliphatic alcohols, vinyl esters such as vinyl acetate vinylidenechloride and acrylonitrile, are to be considered as copolymerization components. These unsaturated compounds are advantageously used in smaller quantities than the chloroprene, preferably in amounts of 0.5 to 50 percent by weight as based on the weight of the total monomers.

The pH value of the polymerization mixtures can fluctuate within wide limits, but pH values of 7 to 12 have proved to be particularly suitable. The polymerization of the monomer takes place even at temperatures of about 5° C., but can also be carried out at higher temperatures. The polymerization is generally terminated by cooling and/or degasification after a yield of 60 to 95 percent has been reached.

The antioxidizing agents which may be used to stabilize the chloroprene are compounds well known in the rubber art where they are added to rubber to prevent its oxidative degradation. These compounds are aromatic hydroxy and amino compounds or derivatives thereof. The aromatic hydroxy compounds include pyrocatechol, hydroquinone, alkylated and styrolized phenols, pyrocatechol and hydroquinone such as p-t-butyl pyrocatechol, p-hydroxydiphenyl, bis-[hydroxyphenyl]methanes and alkylated derivatives thereof such as bis-(2-hydroxy-3-tert.butyl-4-methylphenyl) methane, bis-(2-hydroxy-3-cyclohexyl-5-methylphenyl) methane, aminophenols, e.g. p-aminophenol. Suitable amines are primary and secondary aromatic amines such as p,p'-diaminodiphenylmethane, diphenylamine, styrolized diphenylamines, phenyl-alpha-naphthylamine phenothiazine and derivatives thereof. In the following examples the parts indicated are parts by weight.

Example 1

100 parts of chloroprene, stabilized with 0.1 part of phenothiazine, and 0.2 part of n-dodecylmercaptan (regulator) are combined and emulsified with a solution which consists of 4 parts of the sodium salt of disproportionated abietic acid, 0.8 part of the sodium salt of the condensation product of naphthalene sulphonic acid with formaldehyde, and also 0.9 part of caustic soda in 150 parts of water. The aqueous emulsifier solution is flushed with nitrogen for 15 minutes before being used. The emulsion is brought to a temperature of 5° C., the air is displaced by nitrogen and the polymerization reaction is initiated by adding 0.4 part of boron triethyl and 0.2 part of sulphur. After 12 hours, a yield of 75 percent is reached. The residual chloroprene is then removed in vacuo at a slightly elevated temperature. The latex obtained may be coagulated in known manner by freezing out the copolymer.

Example 2

100 parts of chloroprene, which contain 0.1 part of phenothiazine, are emulsified with 0.2 part of n-dodecylmercaptan and the aqueous phase is flushed with nitrogen as in Example 1. The emulsion is raised, while being stirred to a temperature of 5° C. and then the air is displaced by introducing nitrogen. In spite of adding 0.5 part of boron trialkyl, no polymerization occurs during an observation time of 24 hours as long as no sulphur is present.

Example 3

100 parts of chloroprene, which contain 0.15 part of phenothiazine, are emulsified as in Example 1 with n-dodecylmercaptan and the aqueous-alkali soap solution flushed with nitrogen and polymerized at 15° C. with the aid of 0.45 part of boron triisopropyl and 0.2 part of sulphur. After reaching a yield of 80 percent, the reaction is terminated by degasification.

Example 4

100 parts of chloroprene, which are stabilized with 0.15 part of phenothiazine, are emulsified as in Example 1 with n-dodecylmercaptan, the aqueous-alkali phase being flushed with nitrogen. After driving off the air by means of nitrogen, the polymerization is carried out at a temperature of 10° C. with the aid of 0.5 part of boron tri-n-propyl and 0.3 part of sulphur. After 13 hours, a yield of 75 percent is reached, whereafter degasification and working up is carried out in known manner.

Example 5

90 parts of chloroprene and 10 parts of 2.3-dichlorobutadiene-1.3, which each contain 0.1 percent of phenothiazine, are emulsified with n-dodecylmercaptan and the aqueous alkaline phase as in Example 1 and are polymerized at a temperature of 10° C. with the aid of 0.4 part of boron triethyl and 0.2 part of sulphur. After 10 hours the conversion amounts to 80 percent.

We claim:

1. A process for producing a chloroprene polymer which comprises contacting in an aqueous emulsion chloroprene with about 0.1 to 2.5 percent by weight of a boron trialkyl and 0.5 to 1 percent by weight of molecular sulphur, said proportions by weight being calculated on the weight of chloroprene, thereby causing said chloroprene to polymerize.

2. A process according to claim 1, wherein the pH value of said aqueous emulsion is kept at 7 to 12.

3. A process according to claim 1, wherein a chloroprene is used which contains 0.01 to 3 percent by weight of an antioxidizing agent.

4. A process for producing a copolymer of chloroprene and a further ethylenically unsaturated monomer selected from the group consisting of conjugated diolefins of 4–6 carbon atoms and monoethylenically unsaturated monomers which are copolymerizable with chloroprene, which comprises contacting in an aqueous emulsion chloroprene and said further ethylenically unsaturated monomer with about 0.1 to 2.5 percent by weight of a boron-trialkyl and 0.05 to 1 percent by weight of molecular sulphur, said further unsaturated monomer being employed in an amount of 0.5–50% by weight, said proportions by weight being calculated on the weight of the total monomers, thereby causing said monomers to copolymerize.

5. Process of claim 1 wherein the polymerization temperature is at least 5° C.

6. Process of claim 4 wherein the polymerization temperature is at least 5° C.

References Cited in the file of this patent

UNITED STATES PATENTS

| | | |
|---|---|---|
| 2,685,575 | Heiligmann et al. | Aug. 3, 1954 |
| 2,795,557 | Carney | June 11, 1957 |
| 2,840,551 | Field et al. | June 24, 1958 |